No. 789,877. PATENTED MAY 16, 1905.
D. P. PERRY.
RELIEF VALVE FOR STORAGE BATTERIES.
APPLICATION FILED MAY 22, 1903.
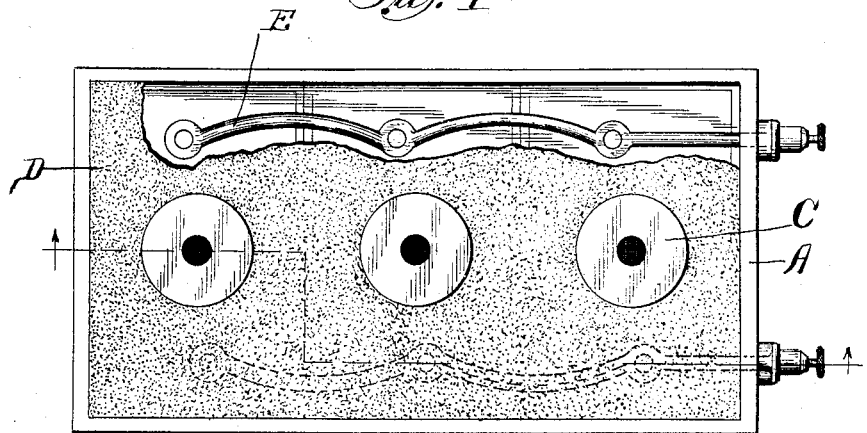
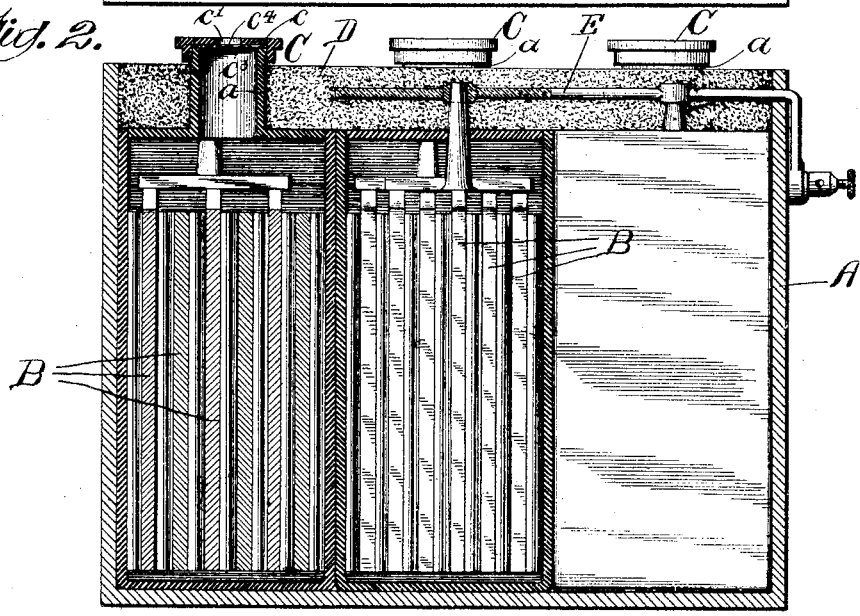
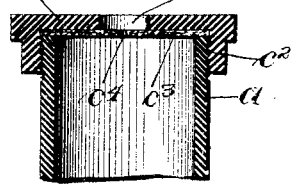
Witnesses:
J. B. Weir
Robert H. Weir
Inventor:
David P. Perry
by Bulkley & Durand
Attys No. 789,877. Patented May 16, 1905.

UNITED STATES PATENT OFFICE.

DAVID P. PERRY, OF CHICAGO, ILLINOIS, ASSIGNOR TO VESTA STORAGE BATTERY COMPANY, A CORPORATION OF MAINE.

RELIEF-VALVE FOR STORAGE BATTERIES.

SPECIFICATION forming part of Letters Patent No. 789,877, dated May 16, 1905.

Application filed May 22, 1903. Serial No. 158,238.

*To all whom it may concern:*

Be it known that I, DAVID P. PERRY, a citizen of the United States of America, and a resident of Chicago, Cook county, Illinois, have invented a certain new and useful Improvement in Relief-Valves for Storage Batteries, of which the following is a specification.

My invention contemplates a simple and efficient valve device which can be applied to any of the many forms or constructions of secondary or storage batteries and which is of a character to not only permit ready access to the interior of the battery, but which is also adapted to permit the generated gases to escape freely and without danger of spilling the electrolyte and without danger of dust or dirt entering the battery.

The nature and advantages of my invention will, however, hereinafter more fully appear.

In the accompanying drawings, Figure 1 is a plan of a storage battery equipped with a relief-valve constructed in accordance with my invention. Fig. 2 is a vertical section of the same. Fig. 3 is an enlarged sectional view of my improved relief-valve.

The storage battery A can be of any suitable known or approved form. As illustrated it comprises a suitable body or receptacle adapted to contain a suitable electrolyte and also adapted to inclose the plates or elements B. Preferably my improved relief-valve C is applied to the top of the battery and is in the form of a cap $c$. This cap is provided with a central opening $c'$ and also with an internally-threaded lower portion $c^2$. Within this threaded lower portion I place a rubber diaphragm $c^3$, which is provided with a minute central opening or pin-prick $c^4$ and which preferably has its marginal portions clamped tightly between the under face or surface of the cap and the top or upper surface of the threaded boss $a$, which latter can be a rigid portion of the battery cell or body. With this arrangement the cap constituting part of the valve device can be readily removed, so as to permit access to the interior of the battery. Furthermore, the rubber diaphragm with its small opening will yield readily to the internal pressure of any gases which may be generated within the battery, and the stretching or outward bulging of the rubber will cause the opening $c^4$ to open sufficiently to permit such gases to escape. Thus the gases can escape constantly and freely and without danger of having the electrolyte spill or slop over. In other words, I provide an elastic or extensible relief-opening which is normally closed or practically closed, but which is capable of stretching or expanding to an extent to permit the ready escape of the gases. At the same time the rubber diaphragm effectually seals the battery against the admission of dust, dirt, or other foreign substances to its interior and also against the undesirable spilling or slopping over of the electrolyte, and, as stated, the valve can be removed for the purpose of affording access to the interior of the battery or for the purpose of replacing an old or impaired diaphragm with a new one.

A mass of suitable material D, such as paraffin or rubber wax, can be packed in around the necks or bosses $a$ of the cells, so as to seal the same and prevent the acid from affecting the connections E.

What I claim as my invention is—

1. A storage battery, comprising a number of cells or compartments, each having a hollow neck or boss, connections for said cells, a rubber diaphragm on each neck or boss, an apertured cap screwed down on each diaphragm, and wax-like material packed in around the said necks or bosses and the said connections.

2. A battery-cell having its top provided with a hollow neck or boss affording access to the interior of the battery, said neck or boss being externally threaded at its upper end, and a disk of thin rubber resting on the upper end of said neck or boss, said disk being elastic and provided with a minute opening adapted to open when the disk is stretched by internal pressure, and a cap provided with an internally-threaded portion adapted to screw upon the externally-threaded portion of the said neck or boss, said cap being adapted to clamp the marginal portions of the said rubber disk upon the upper end of said neck or boss, and the said cap having its top provided with an aperture of sufficient size to expose more or less of the rubber disk immediately surrounding the said minute opening therein, whereby the central portion of said disk may stretch and bulge outwardly for the purpose of opening said minute opening when subjected to said internal pressure due to the generation of gas in the battery.

Signed by me at Chicago, Illinois, this 12th day of May, 1903.

DAVID P. PERRY.

Witnesses:
 CHAS. C. BULKLEY,
 WM. A. HARDENS.